US012069031B2

United States Patent
Malik et al.

(12)

(10) Patent No.: US 12,069,031 B2
(45) Date of Patent: Aug. 20, 2024

(54) PERSISTENCY OF RESOURCE REQUESTS AND RESPONSES IN PROXIED COMMUNICATIONS

(71) Applicant: MICROSOFT TECHNOLOGY LICENSING, LLC, Redmond, WA (US)

(72) Inventors: Vikas Malik, Bothell, WA (US); Nir Mardiks Rappaport, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 17/589,550

(22) Filed: Jan. 31, 2022

(65) Prior Publication Data

US 2023/0247004 A1  Aug. 3, 2023

(51) Int. Cl.
| | | |
|---|---|---|
| H04L 9/40 | (2022.01) | |
| G06F 16/955 | (2019.01) | |
| H04L 67/563 | (2022.01) | |
| H04L 67/02 | (2022.01) | |

(52) U.S. Cl.
CPC ........ *H04L 63/0281* (2013.01); *G06F 16/955* (2019.01); *H04L 63/1408* (2013.01); *H04L 67/563* (2022.05); *H04L 67/02* (2013.01)

(58) Field of Classification Search
CPC ............ H04L 63/0281; H04L 63/1408; H04L 67/563; H04L 67/02; H04L 67/00; G06F 16/955
See application file for complete search history.

(56) References Cited

U.S. PATENT DOCUMENTS

| | | | |
|---|---|---|---|
| 8,543,726 B1 | 9/2013 | Kann et al. | |
| 2009/0259744 A1* | 10/2009 | Kolke | H04L 67/59 709/224 |
| 2012/0278487 A1 | 11/2012 | Woelfel | |

(Continued)

FOREIGN PATENT DOCUMENTS

WO        2020202135 A2    10/2020

OTHER PUBLICATIONS

"International Search Report and Written Opinion Issued in PCT Application No. PCT/US2023/010257", Mailed Date: May 2, 2023, 10 Pages.

*Primary Examiner* — Cheng-Feng Huang
(74) *Attorney, Agent, or Firm* — Shook, Hardy & Bacon L.L.P.

(57) ABSTRACT

The disclosure is generally directed towards a client device agent (e.g., a network agent) learning that a service domain is authenticated via a corresponding suffix proxy domain. The network agent may then direct a service domain request to the suffix proxy domain. The learning process generally involves evaluating headers in URL redirection communications between the client device and an authentication service, such as an identity provider (IDP). Based on a session control policy, the IDP may "bounce" the user to a proxy service (e.g., a suffix proxy). Accordingly, the IDP may include a "bouncer". The network agent generally learns from the headers that a request to a service domain gets redirected (e.g., bounced) to a suffix proxy domain. The agent intercepts subsequent requests to the service domain, updates the request URL, and sends the updated request to the suffix proxy domain.

19 Claims, 7 Drawing Sheets

(56) References Cited

U.S. PATENT DOCUMENTS

| | | | |
|---|---|---|---|
| 2013/0290544 A1* | 10/2013 | Kohli | H04L 67/63 709/226 |
| 2021/0109992 A1 | 4/2021 | Rappaport et al. | |
| 2021/0160220 A1 | 5/2021 | Rappaport et al. | |

* cited by examiner

PERSISTENCY OF RESOURCE REQUESTS AND RESPONSES IN PROXIED COMMUNICATIONS

BACKGROUND

Proxy services, which provide numerous security features, are widely available for today's internet users. In conventional usage, a proxy service may act as a relay between a client of the proxy service (e.g., a user of a communication network) and one or more other parties (e.g., web and/or cloud service providers) that the client is communicating with over the communication network (e.g., the internet). That is, the proxy service may serve as a "man in the middle" between the user and the web/cloud service and relay messages between the two parties. In addition to serving a communication relay, the proxy service may monitor the communication between the user and the web/cloud service provider. When monitoring the communications, the proxy service may provide security services to the user by enforcing one or more security policies. The proxy service may analyze the communications between the two parties, in the context of the security policies. For example, if one or more of the data packets between the parties violates a security policy, the proxy service may employ a security intervention to protect the user from malicious and/or improper communications. Such security interventions may include isolating and/or blocking the transmission of data packets associated with malicious and/or improper communications (e.g., as defined by the security policies) from either of the two parties. Such security policies may be configured by the user or an administrator of the user's computing devices (e.g. the user's employer in the case that the user is utilizing the employer's computing/network assets).

Another service that is currently widely available for internet communications are identity providers (IDPs). IDPs may store, maintain, and/or manage digital identities that enable users to login and access resources (e.g., information, data, and/or other content). For example, when the above mentioned user attempts to access a resource from the web/cloud service provider (e.g., an operator of an application), the application operator may re-direct the user to an IDP. The IDP may authenticate the user's login credentials and provide the application operator an indication that the user is authorized to access the resource. Some IDPs may act as a "bouncer," that bounces a user to a proxy service. When performing a "bouncing" event, the IDP may redirect (or bounce) the user to a proxy service. The IDP may implement bouncing actions, via one or more "session control" policies that characterize which users should be subject to proxied communications. For example, to protect hardware/network resources, a user's administrator may configure an IDP to bounce a particular user (e.g., an employee of a company) to a proxy service.

Communications over a network are typically governed via virtual "addresses," such as a Uniform Resource Locator (URL). In addition to the location of a party's computing device, a URL may encode a location of a requested resource, a location of a proxy service, a location of an IDP, or other such information. When a user is "bounced" from an IDP to a proxy service, various information encoded in a URL (e.g., the location of a requested resource) may be "lost" during the bounce. As such, the expected communication (e.g., a retrieval of a resource) may be un-fulfilled due to the loss of information encoded in the URL.

SUMMARY

Various aspects of the technology described herein are generally directed to systems, methods, and computer storage media, for among other things, providing persistency of resource requests and responses in proxied communications. As described within, in various scenarios, a user may request a resource from a service domain associated with an application service provider (ASP). The ASP may route the user to an identify provider (IDP) that provides user authentication services. Based on session control policies configured at the IDP, the IDP may redirect the user to a proxy service. During the re-direct to the proxy services, the context for the request (e.g., the location of the resource within the service domain) may be lost. Thus, the ASP may not have the context to provide the requested resource without the user requesting the resource for a second time (e.g., after the user has been authenticated by the IDP and the session with the proxy service as a "relay" between the user and the ASP has been established).

More specifically, one non-liming method embodiment includes intercepting a request for a resource. The request may be intercepted prior to the request being received at a service domain. In some embodiments, the request may be have been originated at a client device, and the request is intercepted prior to being transmitted from the client device. For instance, the client device may implement a network agent that monitors and intercepts such requests. The request may be encoded in a first uniform resource locator (URL) that encodes an indication of the service domain and an indication of a location within the service domain associated with the resource. In response to determining that the request is associated with a proxy service, a second URL may be generated. For instance, the network gent may generate the second URL. The second URL encodes the indication of the service domain, the indication of the location within the service domain, and an indication of the proxy service. The second URL may be employed to transmit the request for the resource. Based on the indication of the proxy service encoded in the second URL, the request may be directed to the proxy service prior to being transmitted to the service domain.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Overview of Technical Problems, Technical Solutions, and Technological Improvements The various embodiments enable stable and persistent communications, between a user and a web/cloud service provider, in a situation where a user would otherwise be bounced from an Identity Provider (IDP) to a proxy service. Because the web/cloud service provider typically provides their services through an application and/or web browser, the web/cloud service provider may be referred to as an application service provider (ASP). Various information (e.g., the location of a resource that a user is attempting to retrieve) may be embedded in a virtual address, such as a Uniform Resource Locator (URL). As described above, when bounced from an IDP to a proxy service, some of the information in a URL may be lost. Thus, in various scenarios, a user may request a resource (e.g., a document, a file, data, information, or other content) from a ASP, via a URL that encodes the resources location. The ASP may direct the user to an IDP to authenticate their access credentials. Based on an identity of the user and/or one or more "session control" policies implemented by the IDP, the IDP may bounce the user to a proxy service that monitors and manages communications between the user and the APD. During the bounce, at least a portion of the URL that encodes the location of the requested resource may be lost. When this happens, the ASP may not seamlessly provide the requested resource.

The various embodiments avoid this scenario (and thus provide stable and persistent response to resource requests in proxied communications) by employing a network agent on the user's computing device (e.g., a client computing device). By monitoring the user's communications with various ASPs, the network agent "learns" (and "unlearns") which ASPs the user is required to have proxied communications with. Some embodiments are N=1 embodiments, where only a single instance of a re-direct to a proxy service is required to learn an association between ASP (or a service domain associated with the ASP) and the proxy service for the user. Other embodiments are N>1 embodiments, where at least N instances of a re-direct are required to learn the association. When un-learning an association between service domains and the proxy service, some embodiments are N=1 embodiments, while other embodiments are N>1 embodiments. If a user requests information from an ASP for which the user is normally proxied (via a URL that encodes the location of the requested resource), prior to sending the request to the ASP, the learning agent may update the URL to include the location of the proxied service. In addition to including the proxy location, the updating of the URL may conserve the location of the requested resource. When the updated request is transmitted, the user's request is effectively re-directed to the proxy service, rather than routed directly to the ASP. Because the updated request, which has been re-routed to the proxy service directly from the client device, rather than from a IDP, includes the location of the requested resource, the location of the requested resource is conserved (e.g., the location of the requested resource is persisted) during the proxied communication. Due to the persistence of the location of the requested resource within the URL, once the user has been authenticated, the ASP may provide the user the requested resource, without requiring the user to provide a second request for the resource. In various embodiments, a redirect to a proxy service may be enabled via a suffix included in a URL that re-directs the transmission. Such proxy services may be referred to as suffix proxy services.

As noted above, the user's network agent learns and unlearns for which ASP domains (e.g., a service domain) that the user is required to be proxied. Upon learning that a proxy service is required for the user to communicate with a certain service domain, when the user attempts to communicate with the service domain, the agent may automatically update a URL that includes the service domain with an indication that the communication is to be re-directed to the proxy service, prior to sending the request to the service domain. If a session control policy is changed such that proxy services for that user (and for the service domain) are no longer required, the network agent may cease to update the URL (e.g., to include the location of the proxy service) prior to relaying the request, such that the request is directly transmitted from the client device to the ASP's domain.

Accordingly, the embodiments ensure the persistency of resource requests and responses in proxied communications. That is, a user may request a resource from an ASP, and the ASP may seamlessly provide the requested resource, without the user submitting a second request for the resource, even when the user requires a proxy service between the user's client computing device and the ASP's domain.

The location of the resource within the service domain (encoded in the a URL associated with the request for the resource) may be referred to as the context of the resource request. Also, an ASP may be referred to as a $3^{rd}$ party, the $3^{rd}$ party being a provider and/or operator of web/cloud services (e.g., a $3^{rd}$ party application). The various embodiments maintain (e.g., conserve and/or persist) the context without requiring any changes made by the service domain 3rd party application. This may be enabled by having a network agent replace the un-suffixed domain with the suffixed-domain prior to the redirection to the IDP, so the context is not lost. The network agent may be referred to as an endpoint agent. As noted above, the network agent learn which domains are to be suffixed. In conventional scenarios, this information may only be available at an IDP. However, in the various embodiments, specialized headers may be returned to the client device (from the bouncing of the user from the IDP to the proxy service). The network agent may employ these headers to learn which service domains are associated with the proxy service.

Overview of Environments For Persistent Communications Via Proxy Services

Figure 1A:
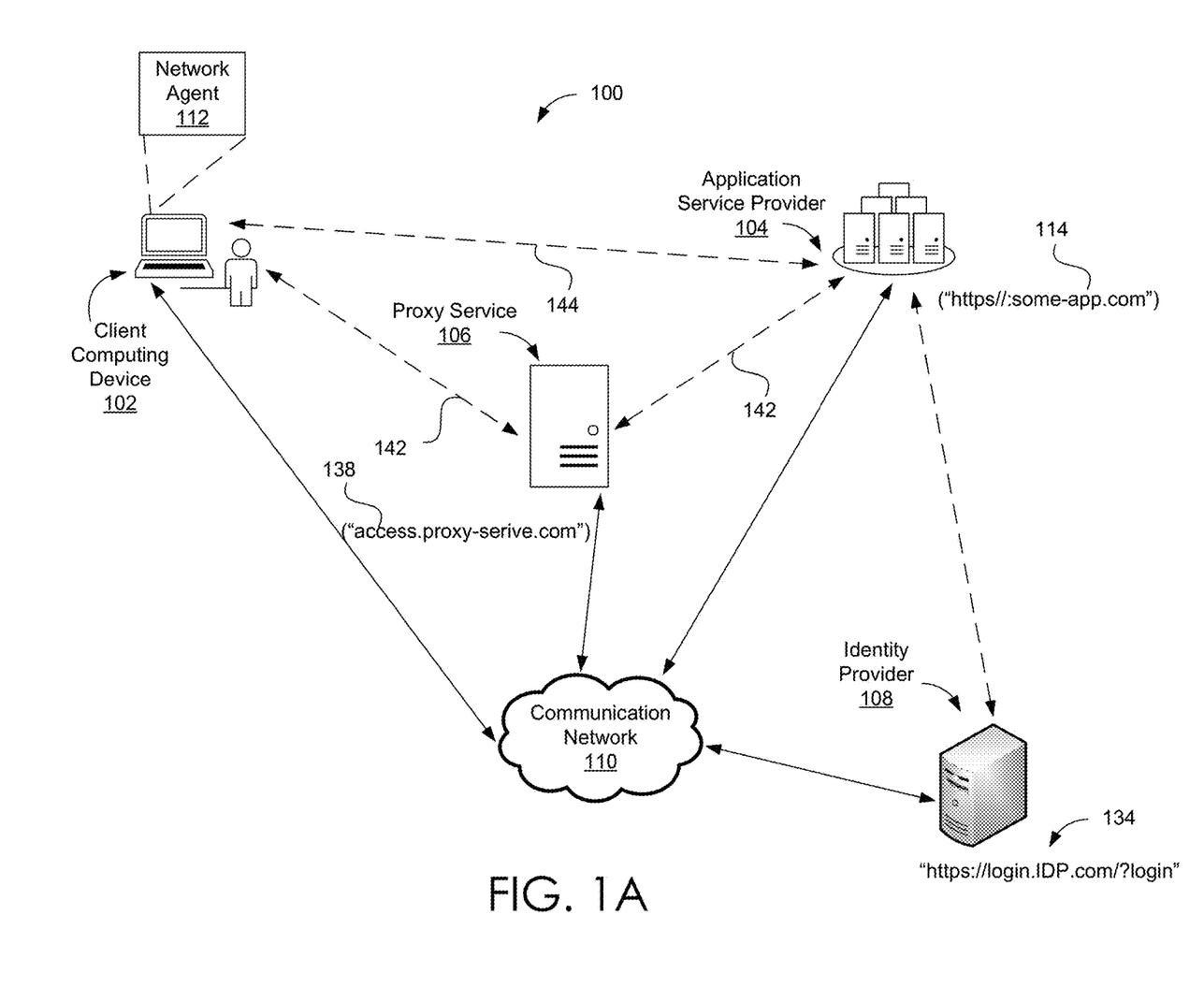
FIG. 1A includes a block diagram showing an example operating environment 100 in which some embodiments of the present disclosure may be employed.

FIG. 1A includes a block diagram showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a client computing device 102, and application service provider (ASP) 104, a proxy service 106, and an identity provider (IDP) 108. The client computing device 102, the ASP 104, the proxy service 106, and the IDP 108 may be communicatively coupled through a communications network 110. To enable the persistency of resource requests and responses in proxied communications, the client computing device 102 may implement a network agent 112, as discussed throughout, including at least in conjunction with at least FIG. 2.

Communication network 110 may be a general or specific communication network and may directly and/or indirectly communicatively coupled to client computing device 102 and server computing device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

Figure 1B:
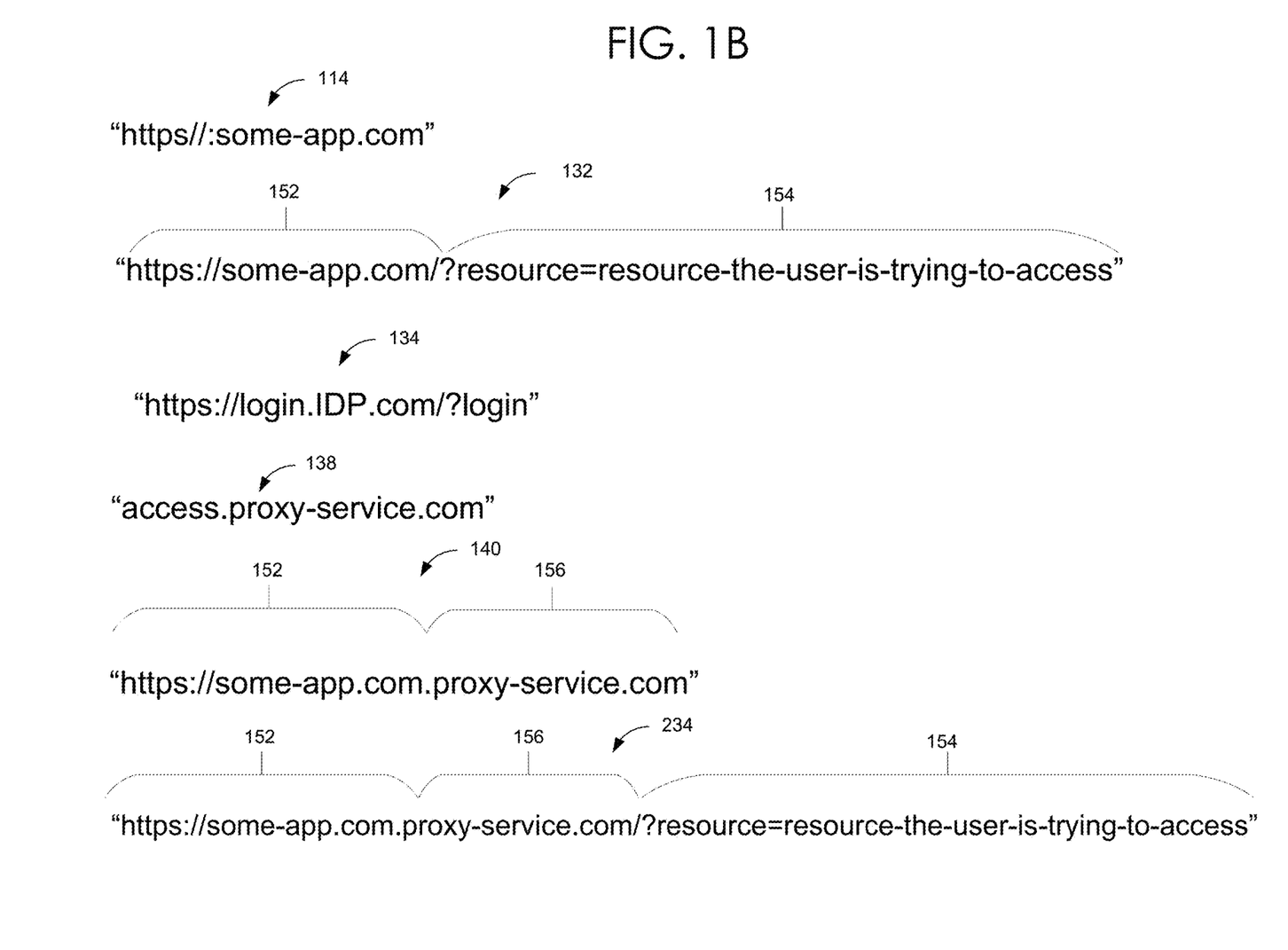
FIG. 1B illustrates various embodiments of universal resource locators, as employed by the various embodiments.
Figure 1C:
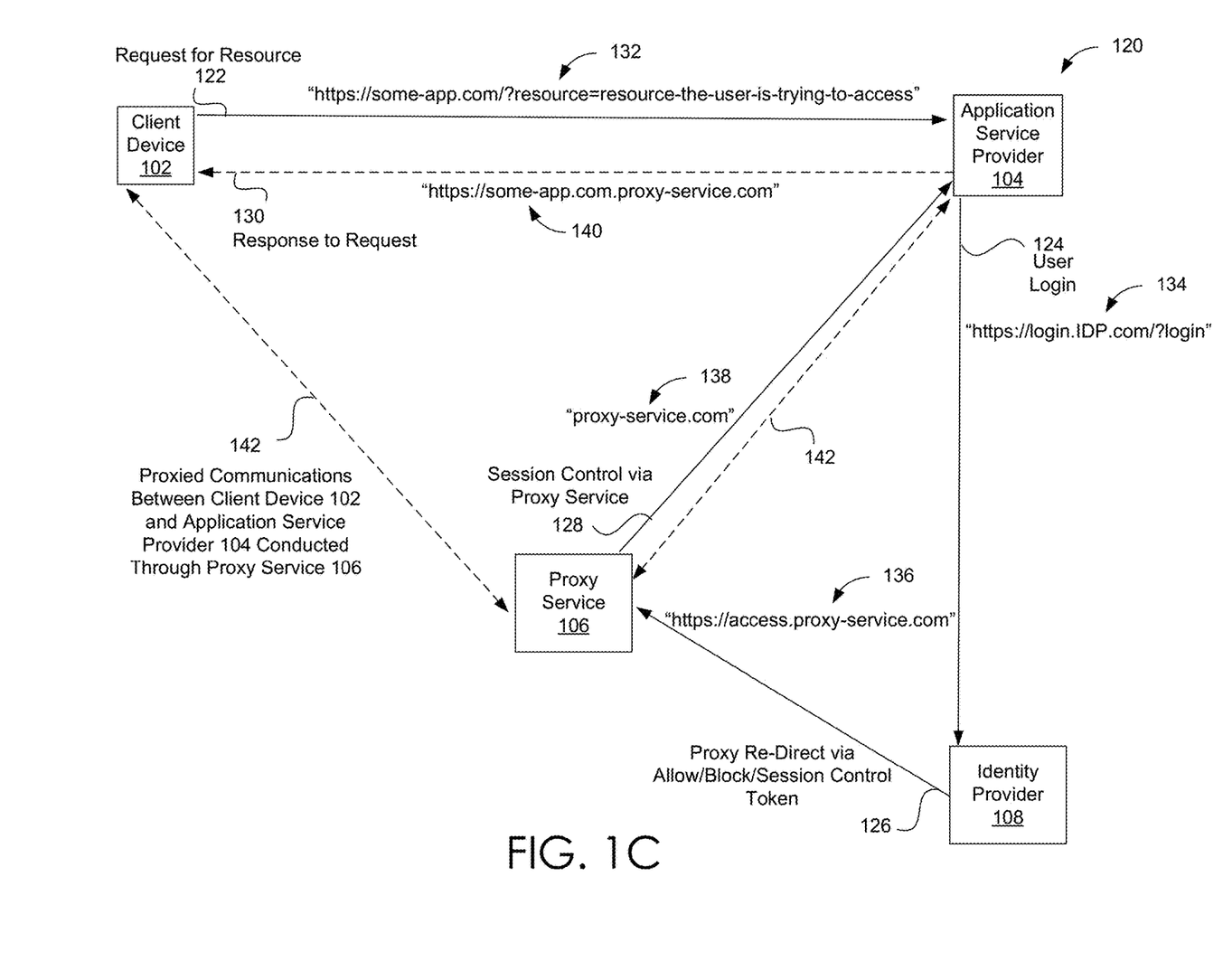
FIG. 1C illustrates a block diagram showing an example proxied communication session.

It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, a local area network (LAN) and/or a wide area networks (WAN). In exemplary implementations, communications network 110 comprises the Internet and/or a cellular network, amongst any of a variety of possible public and/or private networks. Operating environment 100 can be utilized to implement any of the various embodiments described herein. For instance, operating environment 100 also be utilized for implementing various aspects described in conjunction with FIGS. 1C-4.

Overview of Proxied Communications

Aspects of the technical solution can be described by way of examples and with reference to FIG. 1B and additional illustrations below. FIG. 1B illustrates various embodiments of universal resource locators (URLs), as employed by the various embodiments. Note that the URLs of FIG. 1B include the hyper text transfer protocol (HTTP) calls (e.g., https://). In other embodiments, one or more URLs may not include the HTTP call. URL 114 may include a domain of an application service provider (ASP). For example, URL 114 includes the service domain "some-app.com,: which may correspond to a particular ASP (e.g., a party that operates an application, referred to as "some-app". In FIG. 1A, the service domain encoded in URL 114 is associated with ASP 104.

URL 132 encodes the service domain of URL 114, as well as a location (within the service domain) of a resource. More specifically, URL 132 includes a call 152 to a service domain, as well as an address 154 for a requested resource with the service domain. For instance, a user (e.g., a user of client computing device 102 of FIG. 1A) may employ a web browser and/or an application (e.g., "some-app") installed on client device 102 to send an ASP (e.g., ASP 104) a request to provide the resourced indicated by resource address 154. Note that the resource address 154 is a "suffix" URL in URL 132.

URL 134 may be a URL to request a login service from an identity provider (e.g., IDP 108 of FIG. 1A. For instance, an ASP (e.g., ASP 104 associated with service domain 114) may employ URL 134 to request login services from an IDP (e.g., IDP 108), in order to verify that the user has access rights to the resource indicated by resource address 154. That is, the service domain "login.IDP.com" may be a service domain associated with the IDP. URL 138 may be a URL that includes a service call to a proxy service (e.g., proxy service 106 of FIG. 1A). The service domain "proxy-service.com" may be a service domain for the proxy service. An IDP (or a client device) may re-direct a communication to the proxy service via URL 138.

URL 140 is a "suffixed" URL that includes an address for a ASP (prefix 152) and an address for a proxy service (suffix 156). An IDP (e.g., IDP 108) and/or a client device (e.g., client device 102) may redirect a communication to a proxy service (e.g., proxy service 106) via URL 140. URL 234 is another suffixed URL with the prefix address 152 indicating a service domain. The first suffix of URL 134 is the suffix URL 156 indicating a proxy service and the second suffice 154 is the suffix 154 included in URL 13, which indicates a requested resource. As described in conjunction with at least FIG. 2, a client device (e.g., client device 10) may employ URL 234 to re-direct a request for the resource (indicated by suffix URL 154) away from a ASP that stores the resource (e.g., ASP 104) and to a proxy service (e.g., proxy service 106).

FIG. 1C illustrates a block diagram showing an example proxied communication session 120. The communication session 120 is between the client device 102 and application service provider (ASP) 104. In the scenario depicted in FIG. 1C, a proxy service (e.g., proxy service 106) will provide security proxy services for the client device 102, which requires communications between client device 102 and ASP 104 to be re-directed to proxy service 106, which acts as a "man in the middle" between client device 102 and ASP 104. As discussed below, an initial re-direct to proxy service 106 causes a loss of the context for a request. Also, the initial re-direct causes a termination (or abandonment) of session 120 (e.g., a first communication session) and an instantiation of a second communication session between client device 102 and ASP 104. The first session 120 is indicated by solid arrows, while the second communication is indicated by hashed arrows. The second communication session between client device 102 and ASP 104 is moderated by proxy service 106, such that proxy service 106 serves as a monitoring "man-in-the-middles" between client device 102 and ASP 104.

First communication session 120 may begin with the client device 102 requesting access to a resource from the ASP 104. Step 122 (e.g., indicated by a solid arrow) of communication session 120 includes the client device 102 requesting access to the resource via URL 132. For example, a user of the client device may initiate a first communication session with ASP 104 by selecting a link in an application (e.g., "some.app") that is associated with URL 132 and/or typing URL 132 into their web browser. As discussed in conjunction with FIG. 1B, URL 132 includes a prefix 152 which indicates a service domain (e.g., "some-app.com" 114) associated with the ASP 104. URL 132 also includes a suffix URL (e.g., suffix URL 154) that indicates the location of the requested resource within the service domain indicated via the URL prefix 152 of ASP 104. In various embodiments, the location suffix 154 may be referred to as the context of the resource request, because it provides the context for a request. Once received at ASP 104, the ASP 104 may initiate a first communication session with client device 102.

Step 124 of communication session 120 shows the ASP 104 redirecting the client device 102 to identity provider (IDP) 108 for login (e.g., credentialing) services. The URL 134 (e.g., discussed in conjunction with FIG. 1B) may be employed by the ASP 104 to redirect the client device 102 to the IDP 106, so that the user of client device 102 may provide their login credentials. Based on one or more session control policies implemented at the IDP 108, the client device may be redirected to the proxy service 106. For example, a session policy may have been implemented that dictates a user associated with a particular company must employ proxy service 106 during a communication session with ASP 104. Step 126 of communication session shows the ISP 108 redirecting the client device 102 to the proxy service 106, via the URL 136. Note that URL 136 does not include the context (e.g., URL suffix 154) of the resource request. Accordingly, proxy service 104 is unaware of the location of the requested resource.

Based on one or more policies implemented at the proxy service 106, proxy service 106 may determine whether the proxy service will allow the session, block the session, or control the session. In the scenario depicted in communication session 120, the proxy service has determined to control the session, and redirected the communication back to ASP 104 in step 128 via the URL 138, which indicates the domain of the proxy service 106. Note that URL 138 is similar to the URL suffix 156, which indicates a re-direct to the proxy service 104. At this stage of the communication session 120, ASP 104 is aware to employ the proxy service 106 for communications with the client device 102. To redirect communications to the proxy service 104, a URL may be updated to include the URL suffix 156.

As mentioned above, due to the re-direct through the proxy service 106, ASP 104 may initiate a second communication session with client device 102. The second communication session is shown via the hashed arrows (e.g., steps 130 and 142). Also at this stage, the context (e.g., as indicated by URL suffix 154) has been lost. Accordingly, the user is redirected to a "home page" or a "landing page" of the ASP 104, rather than being serviced with the resource they have requested. Hashed arrow 130 shows the ASP 104 responding to the request via the URL 140. URL 140 includes the URL prefix 152 (which indicates the domain of the ASP 104) and the URL suffix 156 (which indicates that the communication should be re-routed through the proxy service 106). For clarity purposes on FIG. 1C, the hashed arrow 130 is shown originating from ASP 104 and going directly to client device 102. Note however that, due to the communication being proxied, hashed arrow 130 may be redirected from ASP 104 to proxy service 106 via the URL suffix 156 ("proxy-service.com"). After the receiving the communication, through the (onshown) redirect of hashed arrow 130 from ASP 104 to proxy service 106, proxy service 106 may then process, analyze, and relay the communication of hashed arrow 130 to client device 102. The redirect and relay (via proxy service 106) of hashed arrow 130 is not shown on FIG. 1C for purposes of clarity in the figure.

Note that URL 140 does not include the URL suffix 154, which indicates the location of the requested resource (e.g., the context of the request). Accordingly, the user of client device 102 will have to request the resource for a second time in this second communication session. The hashed arrows 142 show subsequent communications (of the second communication session) between client device 102 and ASP 104 being re-routed through proxy service 106.

Figure 2:
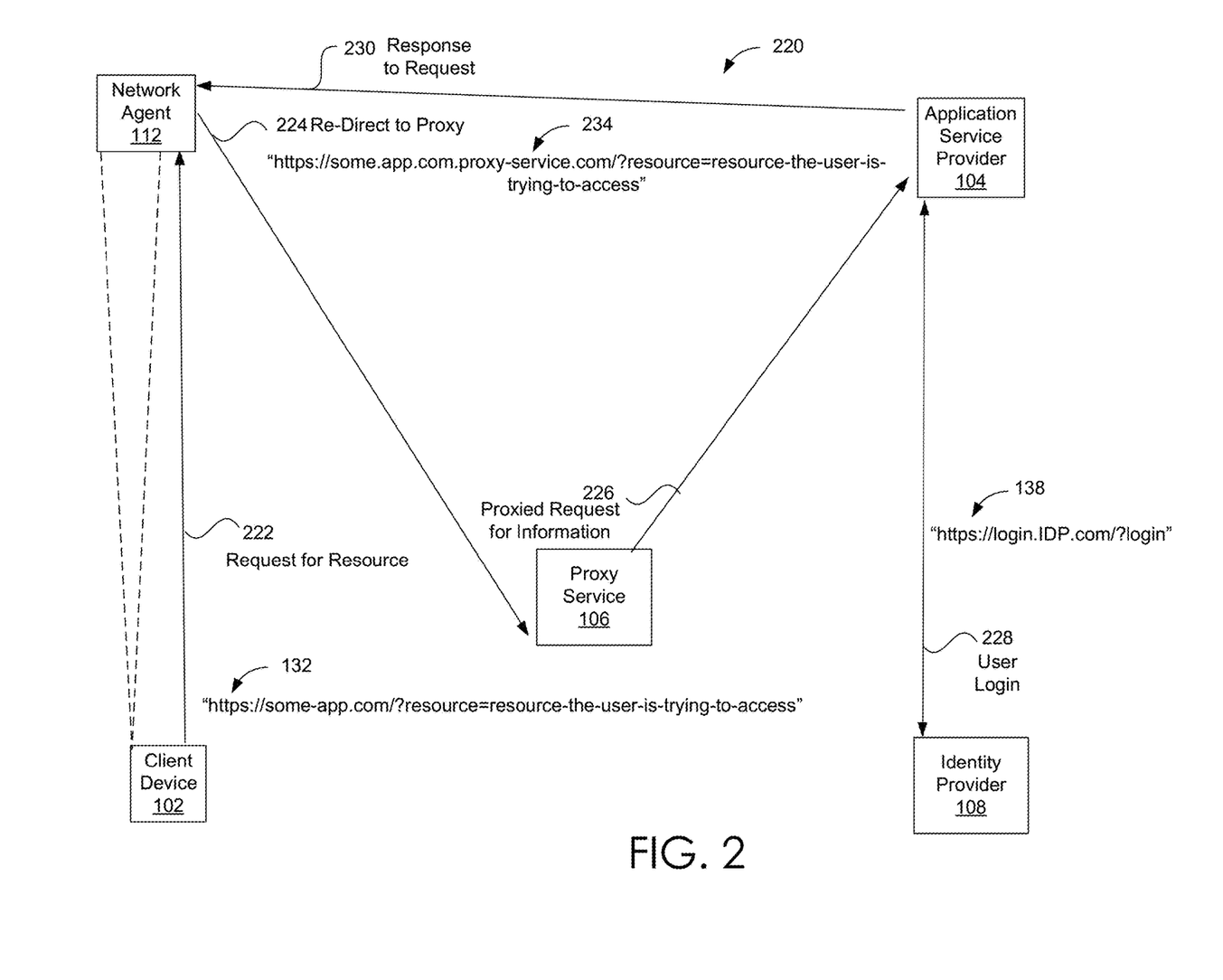
FIG. 2 illustrates a block diagram showing another example proxied communication session, in accordance to the various embodiments.

FIG. 2 illustrates a block diagram showing another example proxied communication session 220. Similar to FIG. 1C, the communication session 220 is between the client device 102 and application service provider (ASP) 104. Also similar to FIG. 1C, in the scenario depicted in FIG. 2, a proxy service (e.g., proxy service 106) will provide security proxy services for the client device 102. In contrast to FIG. 1C, the context of the resource request is not lost during a re-direct to the proxy service 106. The prevention of the loss of the context (e.g., URL suffix 154) of the resource request is enabled via client device 102 implementing a network agent 112. The network agent 112 may serve as a relay or "man-in-the-middle" for each communication packet that is sent from and/or delivered to client device 102. That is, the network agent 112 may monitor all network traffic to and from client device 102. As discussed below, the network agent may "learn" which service domains for which the user (or the user's administrators) require proxy services from proxy service 106. Various "learning" and "unlearning" embodiments are discussed below, at least in conjunction with FIG. 4. For the following discussion, it is assumed that learning agent 112 has already learned that the user requires a redirect to the proxy service 106 when communicating with the service domain of ASP 104 (e.g., "some-app.com").

Similar to communication session 120 of FIG. 1C, the communication session 220 begins with arrow 222, which indicates the client device 102 requesting access to a resource located at ASP 104, via the URL 132. Prior to the request being transmitted from client device 102, the client device's network agent 112 intercepts the request and analyzes the contents of URL 132. Due to previous learning of the network agent 112 (e.g., as discussed in conjunction with at least FIG. 4), the network agent 11 recognizes that user requires proxy services from proxy service 106 when communicating with the service domain "some-app.com," the network generates a second URL (e.g., URL 234) based on the first URL (e.g., URL 132). As discussed in conjunction with FIG. 1B, the second URL 234 generated by the network agent 112 includes a URL prefix 152 (indicating the service domain for ASP 104), a first URL suffix 156 (indicating that the communication is to be re-directed to proxy service 106), and a second URL suffix 154 (indicating the location of the requested resource). That is, the network agents generates a URL indicating that the communication is to be re-directed to the proxy service.

Arrow 224 of communication session 220 shows the request being re-directed to the proxy service 106 (and away from ASP 104). That is, the network agent 112 will generate a redirect for client device 102, via the URL suffix 156 included in URL 234. Via URL 234 (and included URL suffix 156), client device 102 will then redirect the communication 124 and send it to proxy service 106. In contrast to FIG. 1C, where communication session is initially directed to ASP 104, in communication session 220, the request is directed from the client device 102 directly to the proxy service 106, via the updated (or second) URL 234, generated by the network agent 112. Note that the context for the request (e.g., URL suffix 154) is not lost during the re-direct to proxy service 106. Accordingly, proxy service 106 becomes aware of the context of the request via the re-direct and the URL 234, both generated by network agent 112.

Step 226 of communication session 220 indicates the request being forwarded to ASP 104. The forwarded request conserves the initial context of the request. Similar to communication session 120, step 126 of communication session 220 shows that ASP 104 redirecting the user for IDP 108 for login services. After a successful login, ASP 104 can provide the response to the request via step 230 of communication session 220. Note that, similar to the redirection of communication 130 of FIG. 1C, response to request 230 may be re-directed through proxy service 106 (via URL suffix 156), where the proxy service 106 can monitor, analyze, and relay the response 230 to the client device 102. In FIG. 2, the arrow 230 is shown going directly from ASP 104 to client device 102, without the redirect through proxy service 106 for purposes of clarity only. As noted above, response 230 to request 224 may go through proxy service 106, similar to response 130 to request 122 of FIG. 1C. The proxy service 106 will relay response 230 to client device 102.

Also note that the requested resource is provided to the client device 102 via URL 234, which indicates both the context of the request and the re-direct through the proxy service 106. Accordingly, the network agent 112 enables the persistency of resource requests and responses in proxied communications. Note that in contrast to communication session 120 of FIG. 1C, when the client device 102 employs the network agent 112, the user need not request the resource a second time, as in the case of communication session 120 of FIG. 1C.

Figure 3:
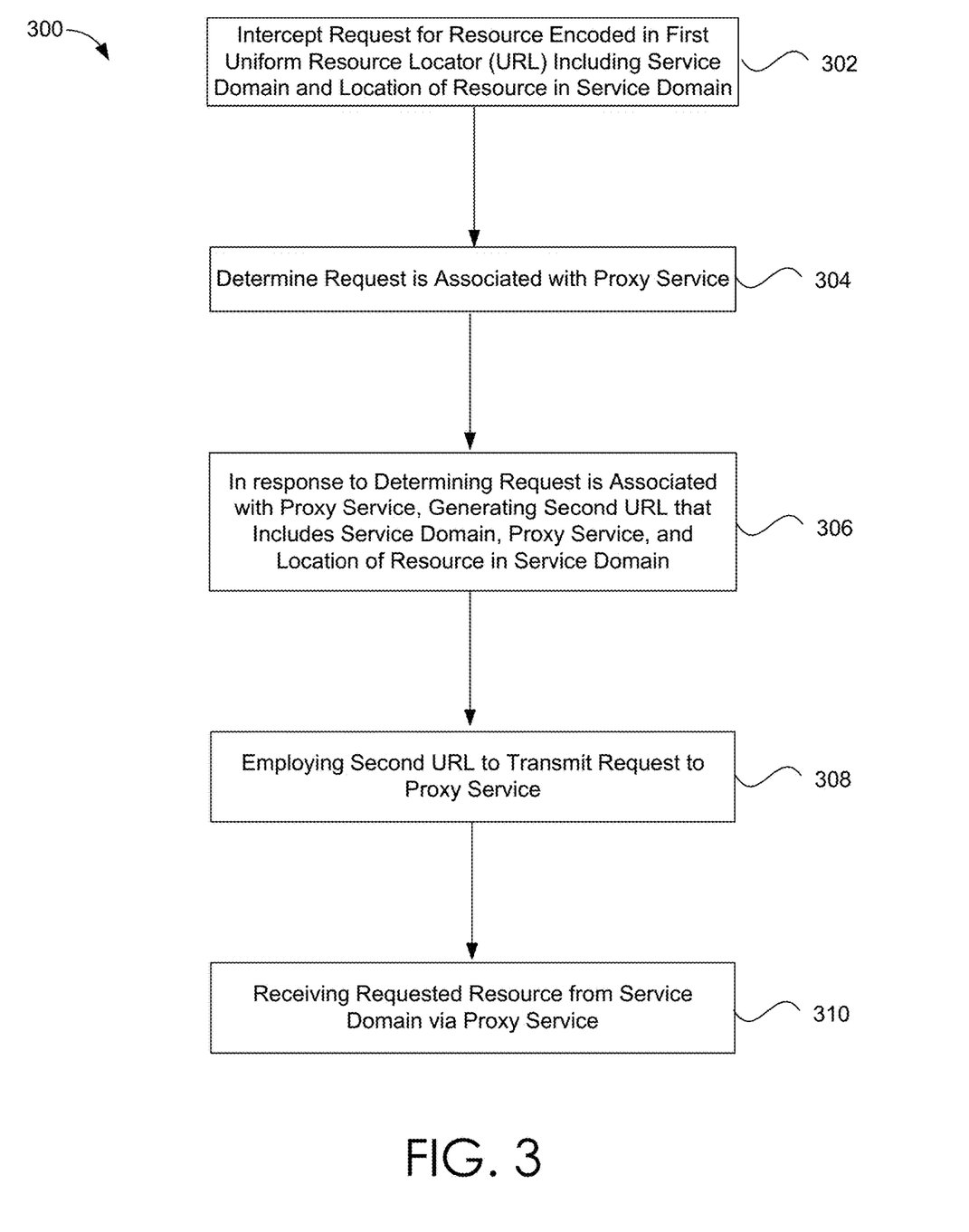
FIG. 3 provides a flow diagram that illustrates a method for providing persistency of resource requests and responses in proxied communications, in accordance to various embodiments.
Figure 4:
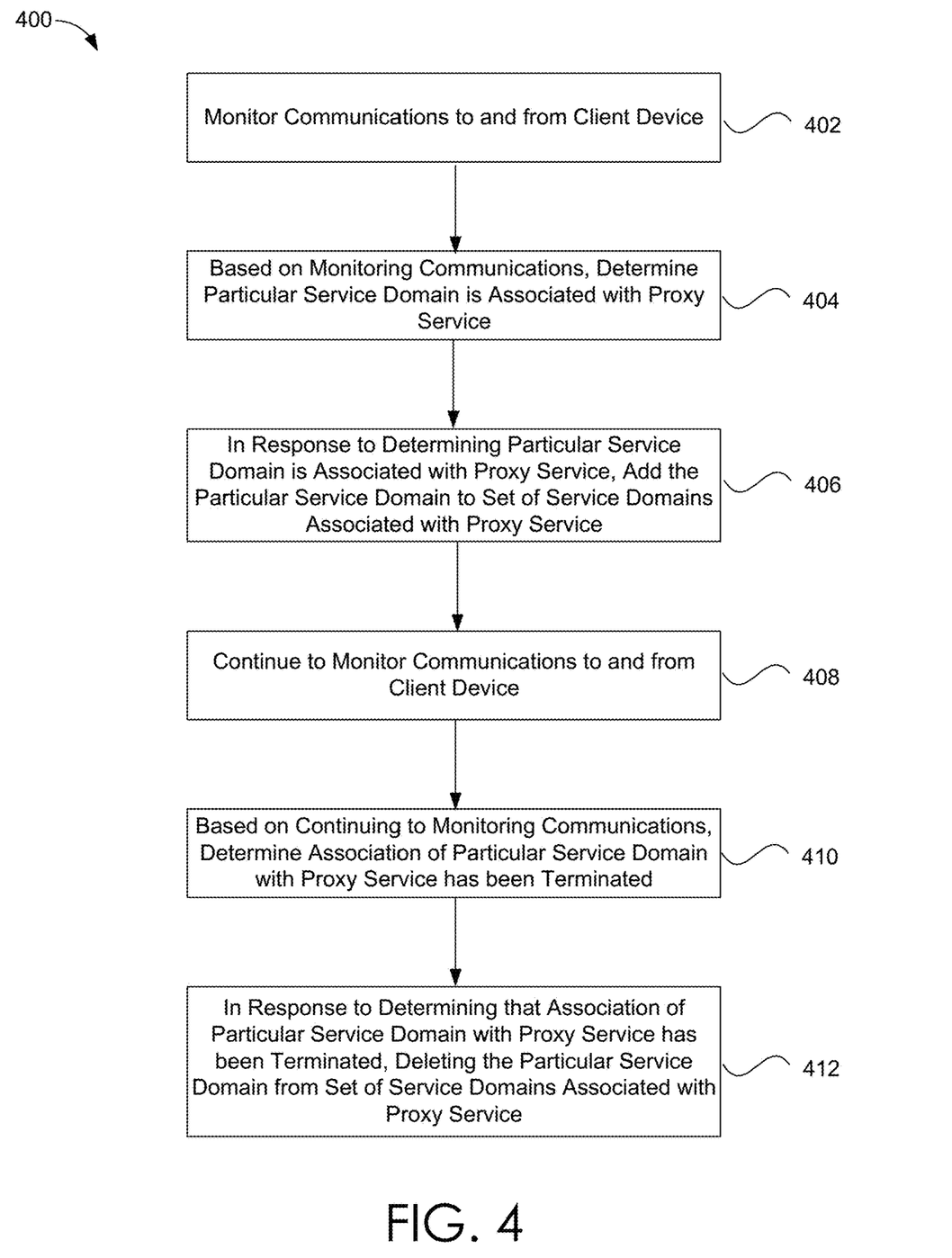
FIG. 4 provides a flow diagram that illustrates a method for learning and unlearning service domains associated with a proxy service, in accordance with the various embodiments.

Example Methods For Persistency of Requests and Responses in Proxied Communications With reference to FIGS. 3-4, flow diagrams are provided illustrating methods for enabling the persistency of resource requests and responses in proxied communications. The methods may be performed using any of the embodiments of a proxied communications environment described herein. In embodiments, one or more computer storage media having computer-executable instructions embodied thereon that, when executed, by one or more processors can cause the one or more processors to perform the methods in the storage system.

Turning to FIG. 3, a flow diagram is provided that illustrates a method 300 for providing persistency of resource requests and responses in proxied communications. Generally, the flow diagram of FIG. 3 can be implemented using the architecture described above at least in conjunction with FIGS. 1A-2. For example, any suitable combination of portions of method 300 may be implemented by a network agent, such as but not limited to network agent 112 of FIG. 1A and FIG. 2.

Initially, method 300 begins at block 302, a request for a resource is intercepted. The resource request may be intercepted prior to the request being received at a service domain (e.g., "some-app.com" as discussed in conjunction with FIGS. 1A-2). In various embodiments, the request originated at a client computing device (e.g., client computing device 102 of FIG. 1A-2). The intended target for transmitting the resource request may be an application service provider (ASP), such as but not limited to ASP 104 of FIGS. 1A-2. A network agent implemented by the client computing device (e.g., network agent 112 of FIGS. 1A-2) may intercept the resource request prior to the client computing device transmitting the resource request. For example, step 222 of communication session 200 of FIG. 1C illustrates the network agent 112 intercepting a resource request, prior to transmission of the resource request. The resource request may be encoded in a first uniform resource locator (URL), such as but not limited to URL 132 of FIGS. 1B-2. As such, the first URL may encode an indication of the service domain (e.g., URL prefix 152 of FIG. 1B) and an indication of a location within the service domain associated with the resource (e.g., the context of the resource request). For instance, the indication of the location of the resource may be indicated in the URL suffix 154 of URL 132.

At block 304, it may be determined that the resource request is associated with a proxy service (e.g., proxy service 106 of FIGS. 1A-2). Determining that the request is associated with a proxy service may include determining that at least one of client device, a user of the client device, or the service domain is associated with the proxy service. Determining that the request is associated with the proxy service may include employing the network agent to determine that the request is associated with the proxy service. For example, method 400 of FIG. 4 provides a method of which service domains are associated with the proxy service (for a particular user). The network agent may keep a list and/or a set of a plurality of service domains that the user requires a proxied communication session for. Determining that the resource request is associated with the proxy service may include employing the network agent to monitor communications transmitted to an from the client device. Based on monitoring the communications, the network agent may be employed to determine the plurality of services domains that are associated with the proxy service, as discussed in conjunction with at least FIG. 4. Determining the set of service domains associated with the service domain may be based on analyzing URLS associated with the proxy service. Previously, the network agent may have learned that the service domain (e.g., "some-app.com") is included in the plurality of service domains that are associated with the proxy service.

At block 306, and in response to determining that the request is associated with a proxy service, a second URL may be generated. For example, the network agent may generate a second URL (e.g., URL 234 of FIG. 1B and FIG. 2) based on the first URL. In at least one embodiment, the network gent updates the first URL to generate the second URL. The second URL encodes the indication of the service domain (e.g., URL prefix 152), the indication of the proxy service (e.g., first URL suffix 156), and the indication of the location of the resource within the servicer domain (second URL suffix 154). In various embodiments, generating the second URL may include generate a first URL suffix (e.g., URL suffix 156) that encodes the indication of the proxy service. Generating the second URL (e.g., URL 234) may be based on a combination of the first URL (e.g., URL 132) and the first URL (e.g., URL 132). As shown in FIG. 1B, the first URL (e.g., URL 132) may include a prefix URL (e.g., URL prefix 152) that encodes an indication of the service domain and a second URL suffix (e.g., URL suffix 154) that encodes the indication of the location within the service domain associated with the resource (e.g., the context of the resource request). In such embodiments, generating the second URL (e.g., URL 234) may be based on a combination of the first URL suffix (152), the second URL suffix (154), and the first URL prefix (156).

At block 308, the second URL may be employed to transmit the resource request to the proxy service. The second URL may enable the re-direction of the service request from the initial target of the ASP to the second target of the proxy service at least based on the indication of the proxy service encoded in the second URL (e.g., first URL suffix 156). That is, due to the network agent updating the first URL and/or generating the second URL, the service request is transmitted to the proxy service at block 308, rather than the ASP. For instance, step 224 of communication session 220 of FIG. 2 shows the service request being re-directed to proxy service 106.

At block 310, the requested resource may be received by the client computing device. For instance, step 230 of communication session 220 shows that receiving of the requested resource at the network agent, and thus the resource may be received by the client computing device. In various embodiments, the requested resource may be received via the proxy service.

FIG. 4 provides a flow diagram that illustrates a method 400 for learning and unlearning service domains associated with a proxy service, in accordance with the various embodiments. Method 400 begins, at block 402, where communications to and from a client device (e.g., client device 102 of FIGS. 1A-2). For instance, a network agent (e.g., network agent 112) may monitor the communications to and from the client device. As discussed throughout, the network agent may be implemented by the client computing device.

At block 404, based on monitoring the communications, the network agent may determine (e.g., "learn") that a particular service domain is associated with the proxy service. In some embodiments, it may only take a single instance of the network agent observing a communication between the client device and the particular service domain (e.g., "some-app.com") being re-routed to the proxy service to learn that the service domain is associated with the proxy service (e.g., N=1 embodiments). In other embodiments (N>1 embodiments), it may take more instances of re-routed communications with a particular service domain for the network agent to learn that the particular service domain is associated with the proxy service.

The learning of which service domains (or applications) are associated with the proxy service (for the user) may be enabled by putting special headers in the response originating from the service domain which is responsible for routing the request to proxy service. Such headers may help the network agent to learn the service domain (or application) being suffixed. In other embodiments, the network agent may learn by monitoring the service domain of each request and see if the service domain ends with the suffix proxy of domain. Domain of an application (e.g., "app.com") may be rewritten as "app.com.suffix.com" if the proxy service employs "suffix.com" as its suffix. By analyzing the service domains of the requests, the network agent can learn which service domains (or applications) are associated with the service proxy for the user. In still other embodiments, special headers may be inserted into the response originating from the proxy service. Such special headers may help network agent to learn the service domain (or application) being suffixed. That is, determining a set of plurality of service domains associated with the proxy service may be based on monitoring communications, received at the client device from the service domain. Learning the set of service domains may additionally include monitoring requests to the service domain originating from the client device. Learning the set of service domains may additionally include monitoring communications, received at the client device from the proxy service.

At block 406, in response to determining that a particular service domain is associated with the proxy service, the particular service domain may be added to a list or a set of service domains that are associated with the proxy service. At block 408, the network agent may continue to monitor the communications to and from the client device. At block 410, based on continuing to monitor the communications, the network agent may determine that the association of the particular service domain with the proxy service has been terminated. That is, in the event that one or more policies have been updated such that the user no longer requires proxy services to communicate with the particular service domain, the network agent may "unlearn" the association. As with learning, some embodiments are N=1 embodiments for unlearning associations, while other embodiments are N>1 embodiments for unlearning the associations. In response to learning and/or determining that the association between the service domain and the proxy service (for the user) has been terminated, the network agent may remove the particular service domain from the set or plurality of service domains that are associated with the proxy service. At block 412, in response to determining that the association between the particular service domain and the proxy service has been terminated (e.g., a session control policy has been changed), the particular service domain may be deleted and/or removed from the plurality and/or list of service domains that are associated with the proxy service.

Additional Embodiments

Some embodiments include a computer-implemented method that comprises intercepting a request for a resource associated with a service domain, prior to the request being received at the service domain. The request may comprise an identifier of a client computing device, a first uniform resource locator (URL) that encodes an indication of the service domain, and an indication of a location within the service domain associated with the resource. The method may further include determining that the intercepted request is associated with a proxy service. In response to determining that the request is associated with the proxy service, a second URL may be generated. The second URL may encode the indication of the service domain, the indication of the location within the service domain, and an indication of the proxy service. The second URL may be employed to transmit the request for the resource. Based on the indication of the proxy service encoded in the second URL, the request may be directed to the proxy service prior to being transmitted to the service domain.

In some embodiments, generating the second URL may include generating a first URL suffix that encodes the indication of the proxy service. The second URL may be generated based on a combination of the first URL and the first URL suffix. In various embodiments, the first URL may include a prefix URL that encodes the indication of the service domain. The first URL may additionally include a second URL suffix that encodes the indication of the location within the service domain associated with the resource. Generating the second URL may further include generating the second URL based on a combination of the first URL suffix, the second URL suffix, and the URL prefix.

In any combination of the above embodiments, the method may further comprise employing a network agent, implemented on the client device, to intercept the request, prior to the client device transmitting the request. The network agent may be further employed to determine that the request is associated with a proxy service. In such embodiments, the network agent may also be employed to generate the second URL.

In any combination of the above embodiments, the method may further comprise employing a network agent to monitor communications transmitted to and from the client device. The network agent may be implemented on the client device. Based on monitoring the communications, the network agent may be employed to determine a plurality of service domains that are associated with the proxy service. Determining the plurality of service domains may be further based on analyzing URLs associated with the communications. The plurality of service domains may include the service domain.

In any combination of the above embodiments, the method may further comprise employing the network agent to determine that the association of the service domain with the proxy service has been terminated. Determining that the association has been terminated may be based on monitoring the communications. In response to determining that the association has been terminated, the service domain may be removed from the plurality of service domains.

In any combination of the above embodiments, determining that the plurality of service domains includes the service domain may be based on at least one of monitoring communications, received at the client device from the service domain, monitoring requests to the service domain originating from the client device, or monitoring communications, received at the client device from the proxy service.

In any combination of the above embodiments, determining that the request is associated with the proxy service may include determining that at least one of the client device, a user of the client device, or the service domain is associated with a proxy service.

Various other embodiments may include a system. The system may comprise one or more hardware processors and one or more computer-readable media having executable instructions embodied thereon. When the instructions are executed by the one or more processors, the one or more hardware processors may be caused to execute actions comprising prior to a request for a resource being received at a service domain, intercepting the request. The request may comprise an identifier of a client computing device, a first uniform resource locator (URL) that encodes an indication of the service domain, and an indication of a location within the service domain associated with the resource. In response to determining that the request is associated with a proxy service, a second URL may be generated. The second URL may encode the indication of the service domain, the indication of the location within the service domain, and an indication of the proxy service. The second URL may be employed to transmit the request for the resource. The request may be directed to the proxy service, prior to being transmitted to the service domain, based on the indication of the proxy service encoded in the second URL. The executed instructions may implement any combination of the above embodiments, including any of the above method embodiments.

Still other embodiments include one or more computer storage media storing computer-useable instructions. When the instructions are used by one or more computing devices, the one or more computing devices may be caused to perform actions comprising, prior to a request for a resource being received at a service domain, intercepting the request. The request may have been originated at a client computing device. The request may be encoded in a first uniform resource locator (URL) that encodes an indication of the service domain and an indication of a location within the service domain associated with the resource. In response to determining that the request is associated with a proxy service, a second URL may be generated. The second URL may encode the indication of the service domain, the indication of the location within the service domain, and an indication of the proxy service. The second URL may be employed to transmit the request for the resource. Based on the indication of the proxy service encoded in the second URL, the request may be directed to the proxy service prior to being transmitted to the service domains. The executed instructions may implement any combination of the above embodiments, including any of the above method and/or system embodiments.

Example Computing Device

Figure 5:
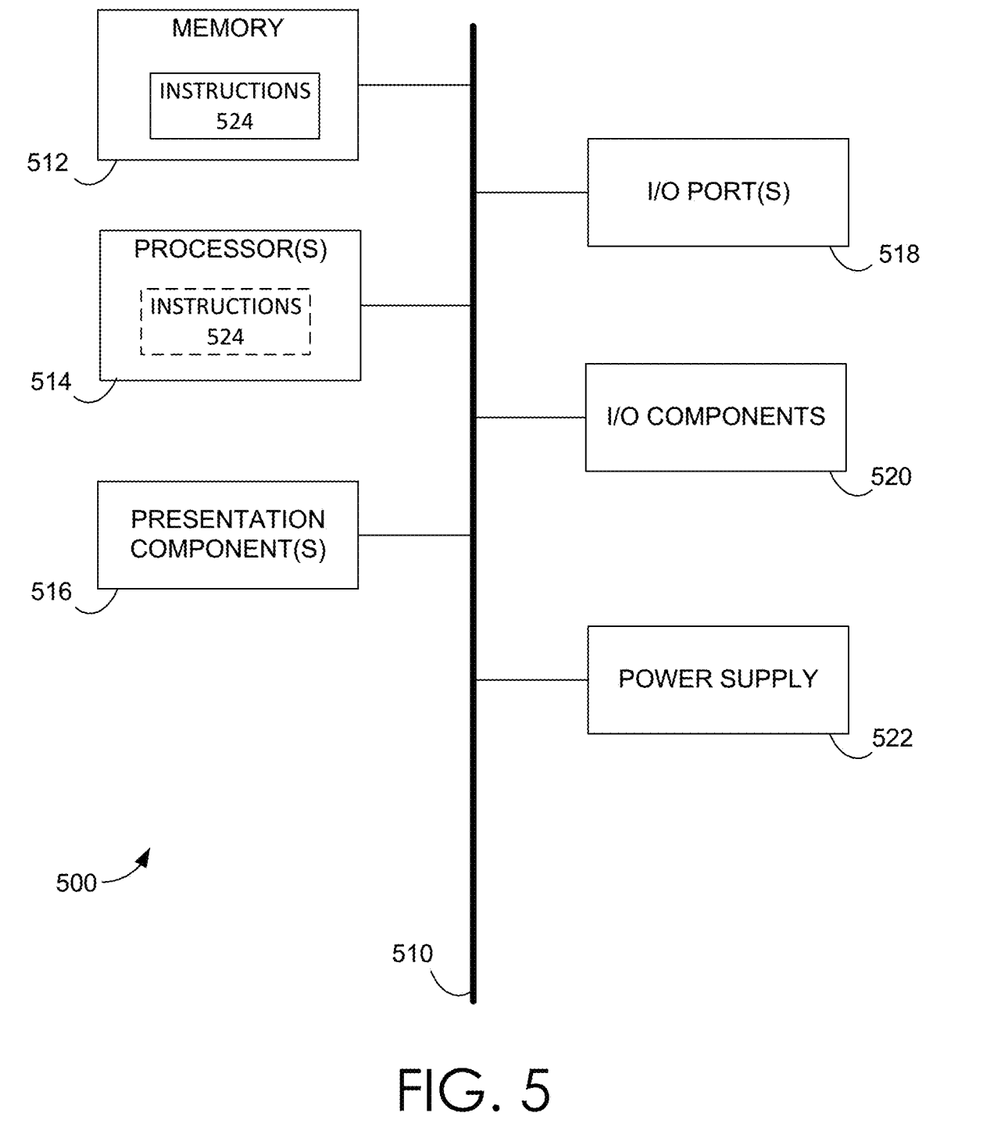
FIG. 5 is a block diagram of an exemplary computing environment suitable for use in implementing aspects of the technology described herein.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. In some implementations, presentation component 220 of system 200 may be embodied as a presentation component 516. Other examples of presentation components may include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting," facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:
   intercepting, by a network agent, a request for a resource, the request for the resource associated with a service domain and comprising:
      an identifier of a client device; and
      a first uniform resource locator (URL) that includes a URL prefix that encodes a first indication of the service domain and a first URL suffix that encodes a second indication of a location within the service domain associated with the resource;
   determining, at the network agent, that the request is associated with a proxy service;
   in response to determining that the request is associated with the proxy service, generating, by the network agent, a second URL that includes:
      the URL prefix that encodes the first indication of the service domain;
      the first URL suffix that encodes the second indication of the location within the service domain; and
      a second URL suffix that encodes an indication of the proxy service, wherein the second URL suffix is determined based on a second URL prefix of a third URL associated with the proxy service; and
   causing the request for the resource to be transmitted to the proxy service based on the second URL prior to the request being obtained by the service domain.

2. The method of claim 1, further comprising:
   monitoring, by the network agent, communications transmitted to and from the client device;
   based on monitoring the communications, employing the network agent to determine a plurality of service domains that are associated with the proxy service, determining the plurality of service domains based on analyzing URLs associated with the communications, wherein the plurality of service domains includes the service domain.

3. The method of claim 2, further comprising:
   based on monitoring the communications, employing the network agent to determine that the association of the service domain with the proxy service has been terminated; and
   in response to determining that the association has been terminated, removing the service domain from the plurality of service domains.

4. The method of claim 2, wherein determining the plurality of service domains includes the service domain is based on at least one of:
   monitoring communications, received at the client device from the service domain;
   monitoring requests to the service domain originating from the client device; and
   monitoring communications, received at the client device from the proxy service.

5. The method of claim 1, wherein determining that the request is associated with the proxy service includes determining that at least one of the client device, a user of the client device, or the service domain is associated with the proxy service.

6. The method of claim 1, wherein employing the second URL to transmit the request for the resource further comprises providing stable and persistent response to the request for the resource in a proxied communication between the client device and the service domain.

7. The method of claim 1, wherein the network agent is implemented on the client device, to intercept the request, prior to the client device transmitting the request.

8. The method of claim 1, wherein the network agent is implemented on the client device to intercept the request, prior to the client device transmitting the request.

9. A system comprising:
one or more hardware processors; and
one or more computer-readable media having executable instructions embodied thereon, which, when executed by the one or more processors, cause the one or more hardware processors to execute actions comprising:
prior to a request for a resource being received at a service domain, intercepting the request, wherein the request comprises:
an identifier of a client device;
a first uniform resource locator (URL) that includes a URL prefix that encodes a first indication of the service domain; and
a first URL suffix that encodes a second indication of a location within the service domain associated with the resource;
in response to determining that the request is associated with a proxy service, generating a second URL by at least:
combining the URL prefix that encodes the first indication of the service domain;
the first URL suffix the encodes the second indication of the location within the service domain; and
a second URL suffix that encodes an indication of the proxy service and is determined based on a second URL prefix of a third URL associated with the proxy service; and
employing the second URL to transmit the request for the resource, wherein based on the indication of the proxy service encoded in the second URL, the request is directed to the proxy service prior to being transmitted to the service domain.

10. The system of claim 9, wherein a network agent is implemented on the client device to intercept the request, prior to the client device transmitting the request.

11. The system of claim 10, wherein the actions further comprise:
employing the network agent, implemented on the client device, to monitor communications transmitted to and from the client device;
based on monitoring the communications, employing the network agent to determine a plurality of service domains that are associated with the proxy service based on analyzing URLs associated with the communications, wherein the plurality of service domains includes the service domain.

12. The system of claim 11, wherein the actions further comprise:
based on monitoring the communications, employing the network agent to determine that the association of the service domain with the proxy service has been terminated; and
in response to determining that the association has been terminated, removing the service domain from the plurality of service domains.

13. The system of claim 11, wherein determining the plurality of service domains includes the service domain is based on at least one of:
monitoring communications, received at the client device from the service domain;
monitoring requests to the service domain originating from the client device; and
monitoring communications, received at the client device from the proxy service.

14. The system of claim 9, wherein employing the second URL to transmit the request for the resource further comprises providing stable and persistent response to the request for the resource in a proxied communication between the client device and the service domain.

15. One or more computer storage media storing computer-useable instructions that, when used by one or more computing devices, cause the one or more computing devices to perform actions comprising:
prior to a request for a resource being received at a service domain, intercepting the request, which originated at a client device, wherein the request is encoded in a first uniform resource locator (URL) that encodes:
a URL prefix that encodes a first indication of the service domain; and
a first URL suffix that encodes a second indication of a location within the service domain associated with the resource;
in response to determining that the request is associated with a proxy service, generating a second URL that encodes:
the URL prefix encoding the first indication of the service domain;
the first URL suffix encoding the second indication of the location within the service domain; and
a second URL suffix encoding an indication of the proxy service, wherein the second URL suffix that encodes the indication of the proxy service is determined based on a second URL prefix of a third URL associated with the proxy service; and
employing the second URL to transmit the request for the resource, wherein based on the indication of the proxy service encoded in the second URL, the request is directed to the proxy service prior to being transmitted to the service domain.

16. The media of claim 15, wherein the
generating the second URL further comprises combining the first URL suffix, the second URL suffix, and the URL prefix.

17. The media of claim 15, further comprising:
employing a network agent, implemented on the client device, to intercept the request, prior to the client device transmitting the request;
employing the network agent to determine that the request is associated with a proxy service; and
employing the network agent to generate the second URL.

18. The media of claim 15, wherein the actions further comprise:
employing a network agent, implemented on the client device, to monitor communications transmitted to and from the client device; and
based on monitoring the communications, employing the network agent to determine a plurality of service domains that are associated with the proxy service based on analyzing URLs associated with the communications, wherein the plurality of service domains includes the service domain.

19. The media of claim 15, wherein employing the second URL to transmit the request for the resource further comprises providing stable and persistent response to the request for the resource in a proxied communication between the client device and the service domain.

\* \* \* \* \*